United States Patent
Gates et al.

(10) Patent No.: US 6,386,411 B1
(45) Date of Patent: May 14, 2002

(54) CANTILEVERED WHEELESS BOAT SUPPORT

(76) Inventors: Steven C. Gates, P.O. Box 1904, Elfers, FL (US) 34680; Richard H. Gates, 6518 Lois St., Callaway, FL (US) 32404

( * ) Notice: Subject to any disclaimer, the term of this patent is extended or adjusted under 35 U.S.C. 154(b) by 0 days.

(21) Appl. No.: 09/551,017

(22) Filed: Apr. 18, 2000

Related U.S. Application Data

(63) Continuation-in-part of application No. 08/987,890, filed on Dec. 10, 1997.

(51) Int. Cl.$^7$ .................................................. B60R 9/00
(52) U.S. Cl. ........................ 224/523; 224/519; 414/462
(58) Field of Search ................................ 224/512–514, 224/518–520, 524, 525, 309, 523, 519; 414/462

(56) References Cited

U.S. PATENT DOCUMENTS

| | | | | |
|---|---|---|---|---|
| 3,612,366 A | * | 10/1971 | Schneider | 224/520 |
| 3,866,772 A | * | 2/1975 | Gardner | 414/462 |
| 5,456,564 A | * | 10/1995 | Bianchini | 414/462 |
| 6,089,430 A | * | 7/2000 | Mehls | 224/524 |
| 6,193,124 B1 | * | 2/2001 | Brazil et al. | 224/521 |

* cited by examiner

*Primary Examiner*—Lee Young
*Assistant Examiner*—Joseph C. Merek

(74) *Attorney, Agent, or Firm*—Ronald E. Smith; Smith & Hopen, P.A.

(57) ABSTRACT

A boat support apparatus includes a hitch member adapted to be secured in cantilevered relation to a trailer hitch of a vehicle. A center bar extends longitudinally from the hitch member and provides the base for the apparatus. A pair of transversely opposed front vertical supports and a pair of transversely opposed rear vertical supports are mounted in longitudinally spaced apart relation relative to one another on a pair of longitudinally extending, transversely spaced apart support beams. The support beams are connected in parallel relation to the center bar by transversely disposed cross supports that are supported at their respective midpoints by the center bar. The forward vertical supports have upper ends disposed at a higher elevation than upper ends of the rear vertical supports. A pair of longitudinally extending, transversely spaced apart runners are secured to and span the upper ends of corresponding front and rear vertical supports, there being a single runner extending between each set of front and rear vertical supports. The runners are disposed in an angular inclination that is predetermined by the respective heights of the front and rear vertical supports. The runners cooperate to support a boat along their respective lengths. In a first embodiment, suitable for use with a passenger car, the angle of the runners is low. In a second embodiment, suitable for use with a van or other high vehicle, the angle of the runners is steep. The angular mounting of the runners allows the respective front ends of the runners to clear the vehicle so that the boat support apparatus is truncate in extent. The cantilevered mounting eliminates any need for wheels and avoids a pivotal connection between a vehicle and a trailer.

7 Claims, 4 Drawing Sheets

CANTILEVERED WHEELESS BOAT SUPPORT

This application is a CIP of Ser. No. 08/987,890 filed, Dec. 10, 1997.

BACKGROUND OF THE INVENTION

1. Field of the Invention

This invention relates, generally, to a boat support. More particularly, it relates to an apparatus that is mounted in cantilevered relation to the trailing end of a vehicle and which supports a boat without the use of a trailer or wheels.

2. Description of the Prior Art

Boat trailers are well known. However, boat trailers having no wheels are not.

Conventional boat trailers of the wheeled type are somewhat undesireable in that their tires become worn with use and require replacement. Moreover, since they are towed, it is difficult to back them into a garage or a dock. The pivotal connection formed by a hitch means that interconnects a trailer to a towing vehicle is notoriously difficult to control when the vehicle is in reverse gear.

Therefore, there exists a need for a boat support that can be attached to the trailing end of a vehicle, but which does not include a trailer structure of the type supported by wheels and which is free of the type of pivotal connection that is difficult to control.

Another drawback of conventional trailers is that they are quite long, typically taking up at least as much roadway space as the towing vehicle. This makes it difficult to find a parking space.

Accordingly, there is a need for a boat support of truncate extent so that less parking space is needed.

However, in view of the prior art considered as a whole at the time the present invention was made, it was not obvious to those of ordinary skill in this art how a trailerless, wheeless, and truncate support for a boat could be provided.

SUMMARY OF THE INVENTION

The long-standing but heretofore unfulfilled need for a boat support of truncate extent that is adapted to be hitched to a conventional hitch means of a vehicle so that it can be towed in trailing relation to said vehicle but which is free of pivotal connections and which requires no wheels is now met by a new, useful, and nonobvious invention.

The novel boat support includes a hitch member at its leading end that is adapted to be secured to a trailer hitch of an automobile in cantilevered relation thereto. The leading end of a longitudinally disposed center bar is secured to the hitch member and extends therefrom in trailing relation thereto. The remaining structural parts of the novel boat trailer are supported by this center bar.

A pair of longitudinally disposed support beams are disposed on opposite sides of the center bar, in parallel relation thereto.

The support beams have free leading ends adapted to be positioned beneath a bumper of the towing vehicle to strengthen the cantilevered mounting of the novel boat support.

A pair of upstanding front vertical supports are provided, each of which is mounted on a different one of the support beams, toward respective leading ends thereof. The front vertical supports are disposed in transversely opposed relation relative to one another.

A pair of upstanding rear vertical supports are also provided, each of which is mounted on a different one of said support beams, at the respective trailing ends thereof. The rear vertical supports are disposed in transversely opposed relation to one another and in longitudinally spaced apart, trailing relation relative to the front vertical supports.

A first transversely mounted cross support is positioned near the leading end of the center bar and is supported at its mid-point by said center bar. The opposite ends of the first cross support engage the support beams near their respective leading ends.

A second transversely disposed cross support also extends in interconnecting relation to the forward vertical supports, said second cross support being spaced upwardly of said first cross support.

A third transversely mounted cross support is supported at its mid-point by the center bar at the trailing end of the center bar. The opposite ends of said third cross support engage the trailing ends of the support beams.

A fourth transversely mounted cross support also extends in interconnecting relation to the rearward vertical supports, said fourth cross support being spaced upwardly of said third cross support.

The front vertical supports have upper ends disposed at a common preselected elevation that is higher than a common preselected elevation of the upper ends of the rear vertical supports.

In a first embodiment, the difference in respective heights of said front and rear vertical supports is less than it is in a second embodiment.

A longitudinally disposed first runner spans a first front vertical support and a first rear vertical support in interconnecting relation thereto, said first front and rear vertical supports being in longitudinally spaced apart relation to one another on a common side of said center bar. The first runner is disposed at a preselected angular inclination that is predetermined by a height difference in the respective upper ends of the first front and rear vertical supports.

A longitudinally disposed second runner spans a second front vertical support and a second rear vertical support in interconnecting relation thereto, said second front and rear vertical supports being in longitudinally spaced apart relation to one another on a common side of said center bar. The second runner is disposed at a preselected angular inclination that is predetermined by a height difference in the respective upper ends of the second front and rear vertical supports. The angular inclination of the First runner is the same as that of the second runner.

It is an important object of this invention to provide a wheeless boat support for a vehicle to supplant the need for a conventional trailer with wheels that is pivotally connected to the vehicle by a hitch means, thereby eliminating the problems associated with wheels and further eliminating the problem associated with backing such trailers into a space.

Another object is to provide a truncate boat support so that less space is required to park a land vehicle that is transporting a boat.

Another object is to fulfill these objects with a durable and reliable structure that is economical to manufacture and which is therefore affordable by consumers.

BRIEF DESCRIPTION OF THE DRAWINGS

For a fuller understanding of the nature and objects of the invention, reference should be made to the following detailed description, taken in connection with the appended drawings, in which:

FIG. 6 is a side elevational view thereof depicting use with a receiver hitch.

DETAILED DESCRIPTION OF THE PREFERRED EMBODIMENT

Figure 1:
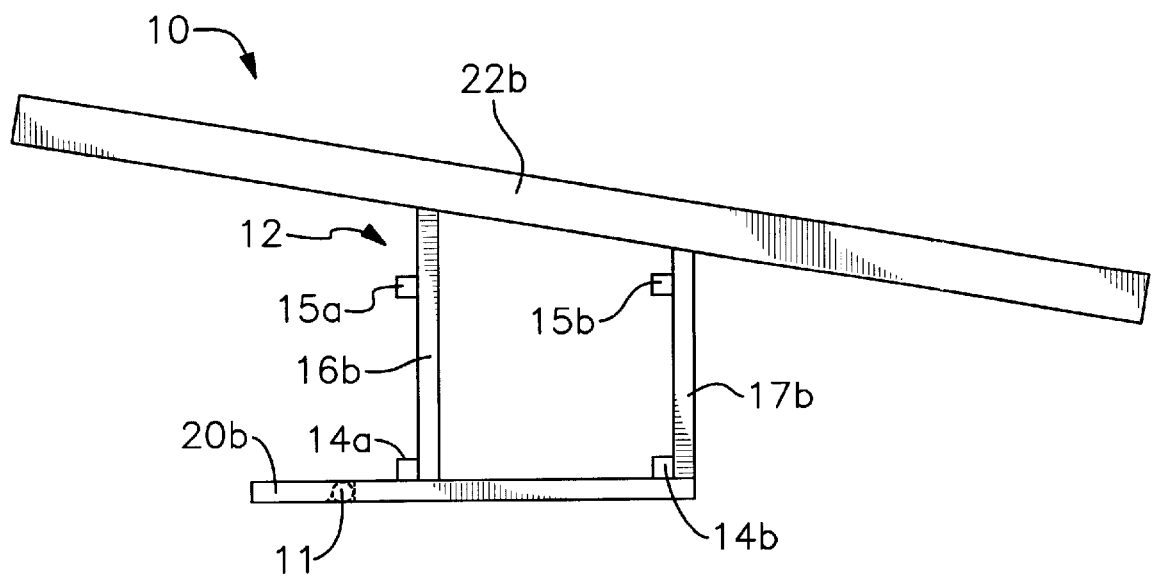
FIG. 1 is a side elevational view of an illustrative embodiment of the novel boat support.
Figure 2:
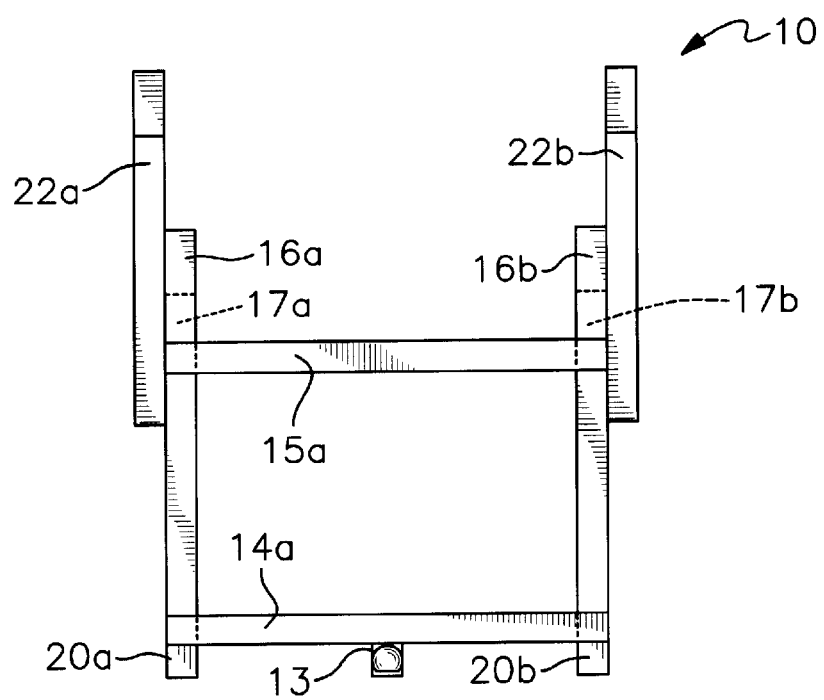
FIG. 2 is a front elevational view thereof.
Figure 3:
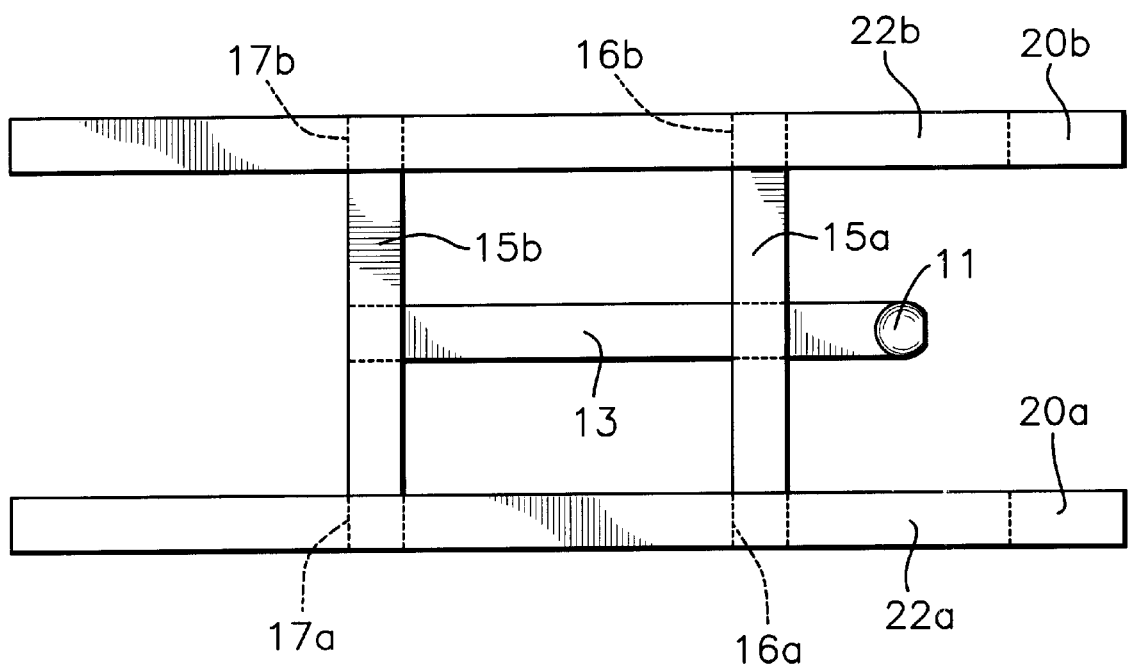
FIG. 3 is a top plan view thereof.

Referring now to FIGS. 1–3, it will there be seen that an illustrative embodiment of the present invention is denoted as a whole by the reference numeral 10.

Hitch member 11 is adapted for cantilevered engagement to a hitch means that is mounted to the trailing end of a land vehicle. The leading end of center bar 13 (FIG. 3) is secured to hitch member 11 and extends longitudinally therefrom in trailing relation thereto.

A pair of longitudinally disposed support beams 20a, 20b are disposed on opposite sides of said center bar 13, in parallel, coplanar relation thereto.

A pair of vertically disposed forward supports 16a, 16b are mounted on support beams 20a, 20b, respectively, near the leading end of said support beams, in laterally spaced apart relation to one another.

A pair of vertically disposed supports 17a, 17b are mounted on support beams 20a, 20b, respectively, at the trailing ends thereof, in laterally spaced apart relation to one another.

Forward supports 16a, 16b have greater vertical extent than their corresponding rearward vertical supports 17a, 17b.

Forward vertical supports 16a, 16b are interconnected to one another at their respective lowermost ends by first transversely disposed cross support 14a and near their respective uppermost ends by second transversely disposed cross support 15a. Rearward vertical supports 17a, 17b are interconnected at their respective lowermost ends by third transversely disposed cross support 14b and near their respective uppermost ends by fourth transversely disposed cross support 15b.

An elongate runner 22a is secured to the respective uppermost ends of forward and rearward vertical supports 16a, 17a. Similarly, elongate runner 22b is secured to the respective uppermost ends of forward and rearward vertical supports 16b, 17b. Accordingly, said runners are parallel to one another and share a common inclination.

Figure 4:
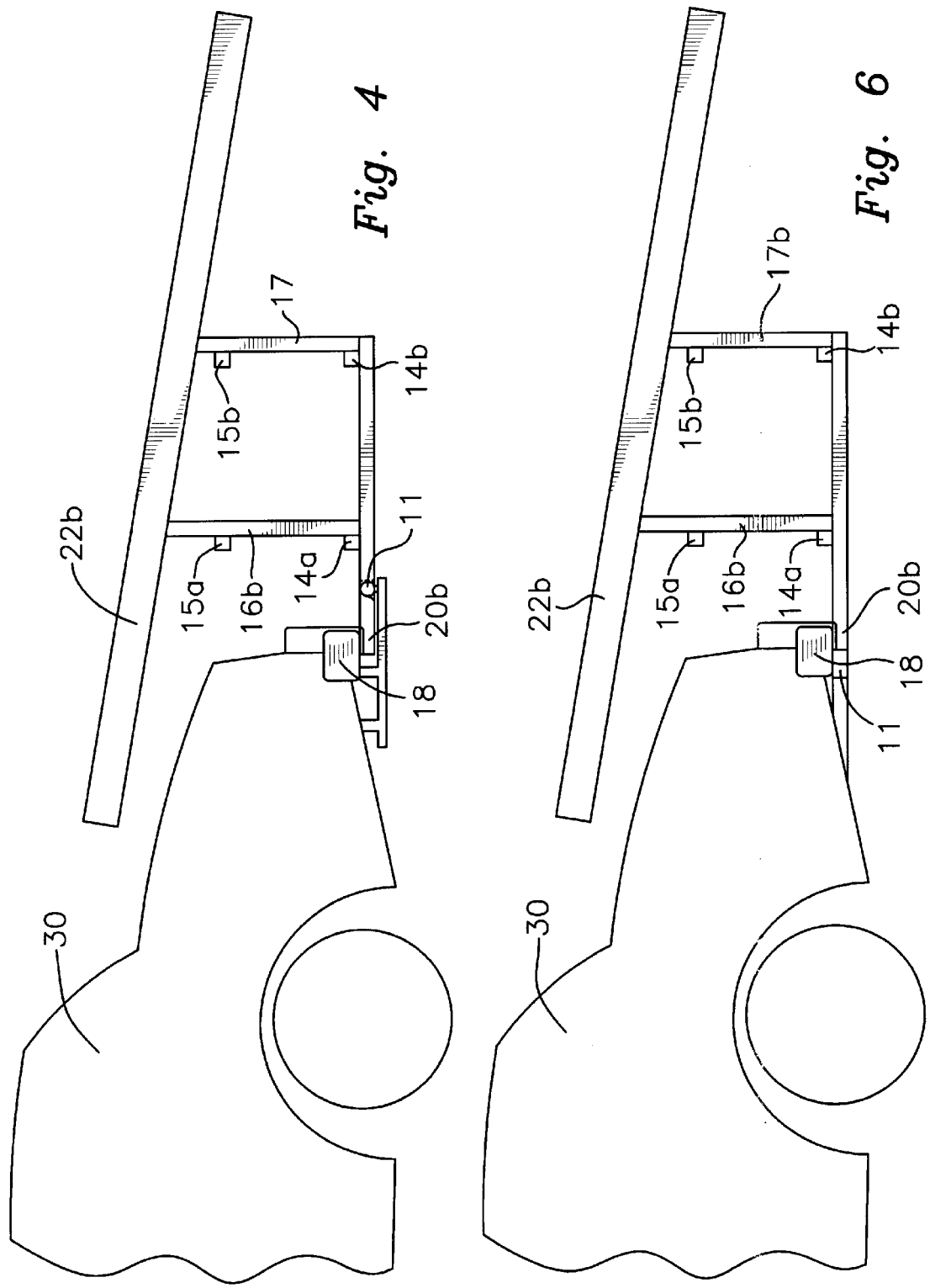
FIG. 4 is a side elevational view thereof, depicting use of the novel boat support structure with an automobile.
Figure 5:
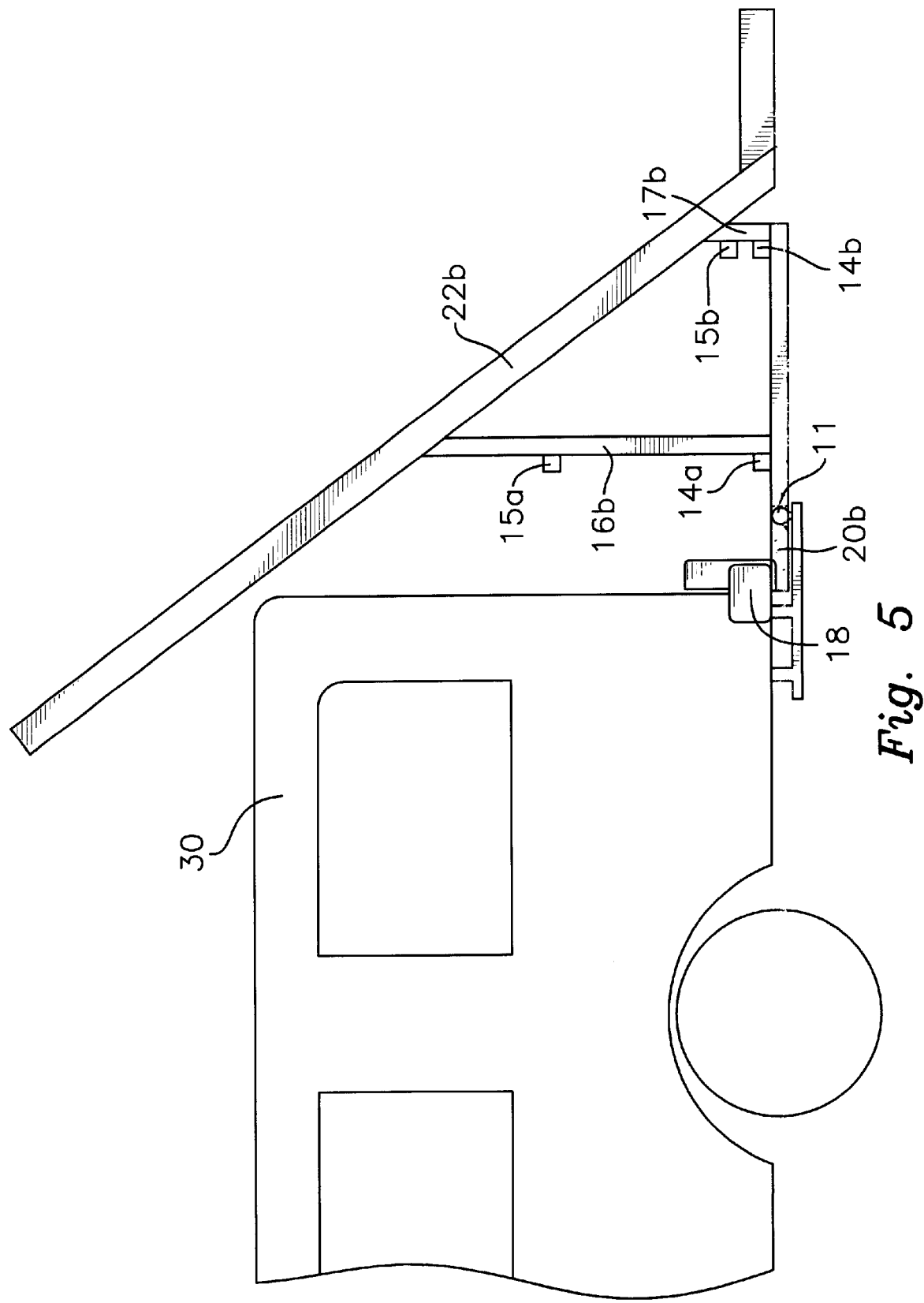
FIG. 5 is side elevational view depicting use with a van.

When forward vertical supports 16a, 16b are only a little taller than rearward vertical supports 17a, 17b, the slope of runners 22a, 22b is sufficient to allow the respective forward ends thereof to clear the trunk of a car 30 as indicated in FIG. 4. The difference in heights of the vertical supports is greater, however, when it is desired to slope runners 22a, 22b at an inclination sufficient to clear a tall vehicle, as depicted in FIG. 5.

FIG. 6 depicts the inventive structure when connected to a receiver hitch means. Note that, unlike a ball hitch, a receiver hitch does not rotate up or down at the point of connection between the hitch means of a lead vehicle and the hitch member of a trailing structure. Thus, the leading ends of support beams 20a, 20b need not extend under vehicle 30 when a receiver hitch is used.

In this way, a novel boat support is provided that eliminates the need for a trailer assembly of the type having wheels. The novel assembly further eliminates the troublesome pivotal connection between towing vehicles and trailers. Moreover, it provides a boat support of truncate extent and has utility with low profile cars as well as high profile vans or sport utility vehicles.

It will be seen that the objects set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

Now that the invention has been described, What is claimed is:

1. An apparatus for supporting a boat at the trailing end of a vehicle, comprising:

a hitch member adapted to be secured to a trailer hitch of said vehicle in cantilevered relation thereto;

a horizontally disposed center bar secured to and extending longitudinally from said hitch member;

a pair of support beams horizontally disposed each being on an opposite side of said horizontally disposed center bar in parallel, coplanar relation therewith;

first and second upstanding front vertical supports, each of which is mounted on a different one of said horizontally disposed support beams, said front vertical supports being disposed in transversely opposed relation relative to one another;

first and second upstanding rear vertical supports, each of which is mounted on a different one of said horizontally disposed support beams, said rear vertical supports being disposed in transversely opposed relation to one another and said rear vertical supports being longitudinally spaced apart from said front vertical supports in trailing relation thereto said first front vertical support and first rear vertical support being on said same horizontally disposed support beam;

said front vertical supports having upper ends disposed at a preselected elevation that is higher than a preselected elevation of upper ends of said rear vertical supports;

first runner interconnected to the upper ends of said first front vertical support and said first rear vertical support; and second runner interconnected to the upper ends of said second front vertical support and said second rear vertical support.

2. The apparatus of claim 1, further comprising:

a first cross support horizontally disposed in interconnecting relation between said front vertical supports, said first cross support also being disposed in interconnecting relation to said support beams and being supported at its mid-point by said center bar.

3. The apparatus of claim 2, further comprising:

a second cross support horizontally disposed in interconnecting relation between said front vertical supports, said second cross support being disposed in vertically spaced apart relation to said first cross support.

4. The apparatus of claim 3, further comprising:

a third cross support horizontally disposed in interconnecting relation between said rear vertical supports, said third cross support also being disposed in interconnecting relation to said support beams and being supported at its mid-point by said center bar.

5. The apparatus of claim 4, further comprising:

a fourth cross support horizontally disposed in interconnecting relation between said rear vertical supports, said fourth cross support being disposed in vertically spaced apart relation to said third cross support.

6. The apparatus of claim 1, wherein said support beams have free leading ends adapted to be positioned beneath a bumper of said vehicle when said trailer hitch is a ball hitch.

7. The apparatus of claim 1, wherein said support beams have free leading ends that need not extend beneath a bumper of said vehicle when said trailer hitch is a receiver hitch.

* * * * *